United States Patent [19]

Priefert

[11] Patent Number: 4,962,953
[45] Date of Patent: Oct. 16, 1990

[54] ANIMAL GATE LATCH MECHANISM

[75] Inventor: William D. Priefert, Mt. Pleasant, Tex.

[73] Assignee: Priefert Mfg. Co., Inc., Mt. Pleasant, Tex.

[21] Appl. No.: 472,877

[22] Filed: Jan. 31, 1990

[51] Int. Cl.$^5$ .............................................. E05C 9/02
[52] U.S. Cl. ..................................... 292/36; 292/153; 292/158
[58] Field of Search ................. 292/36, 158, 153, 68, 292/161, 217, 156, 157, 162, 113, 256–269, 97

[56] References Cited

U.S. PATENT DOCUMENTS

| 753,857 | 3/1904 | Correll | 292/158 |
|---|---|---|---|
| 846,804 | 3/1907 | Patton | 292/36 |
| 863,645 | 8/1907 | Reily | 292/68 X |
| 2,577,930 | 12/1951 | Thomas | 292/68 |
| 2,579,974 | 12/1951 | Scott et al. | 292/256.69 X |
| 3,353,857 | 11/1967 | Mongor | 292/157 |
| 3,520,567 | 7/1970 | Von Gilst | 292/162 X |
| 4,531,769 | 7/1985 | Glancy | 292/113 |

Primary Examiner—Richard E. Moore
Attorney, Agent, or Firm—Rudolph L. Lowell

[57] ABSTRACT

An animal gate latch mechanism having upper and lower latch units movable successively and alternatively between gate open and gate latching positions therefor by a linkage system including a single actuating arm. From a gate open position of both latch units, movement of the actuating arm in one direction will independently move the latch units to the gate latching positions therefor. An intermediate latched condition of the gate is thus provided which can quickly and easily be effected by an operator on horseback. With both latch units in the latched position therefor, the gate is securely latched at two spaced-apart locations to prevent twisting of the gate by a confined animal and its possible escape therethrough.

6 Claims, 2 Drawing Sheets

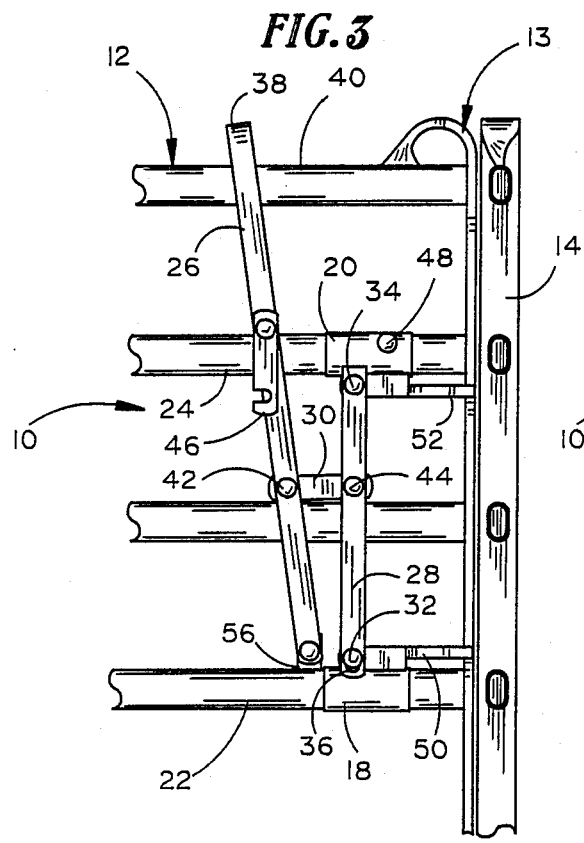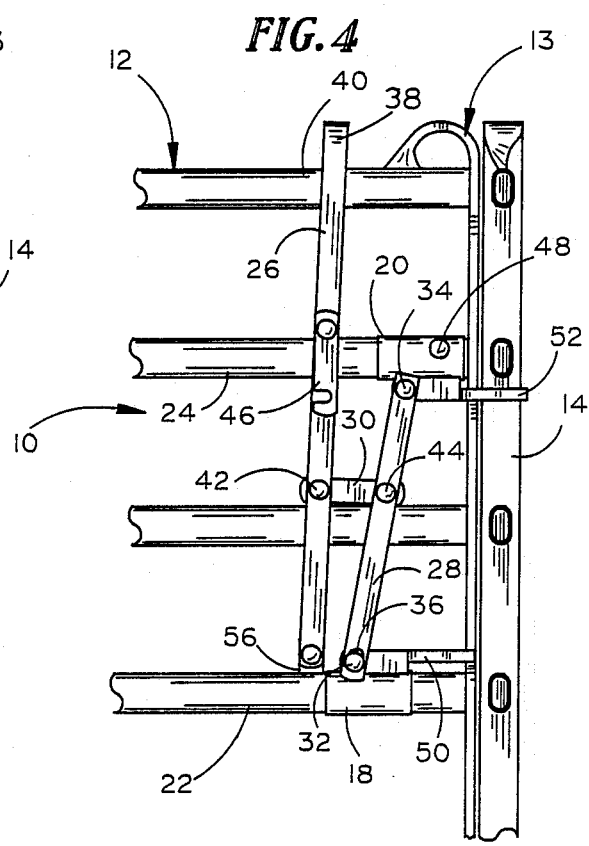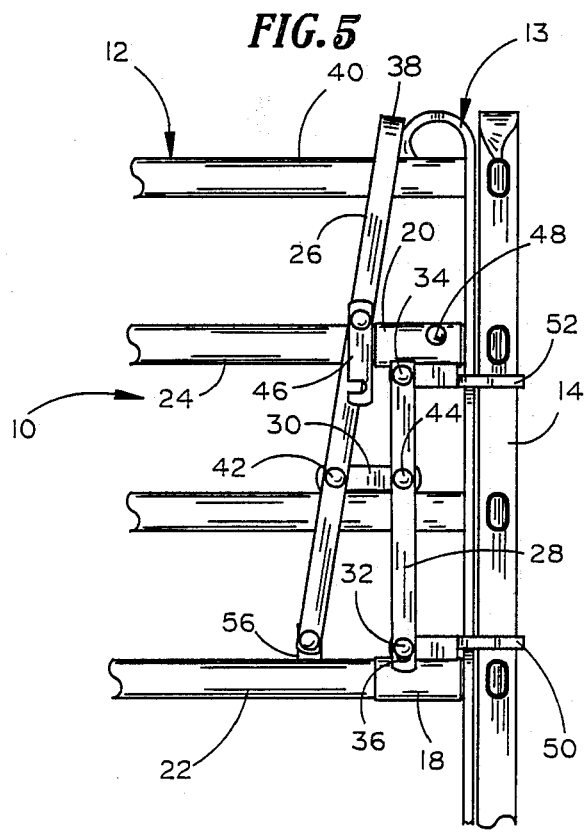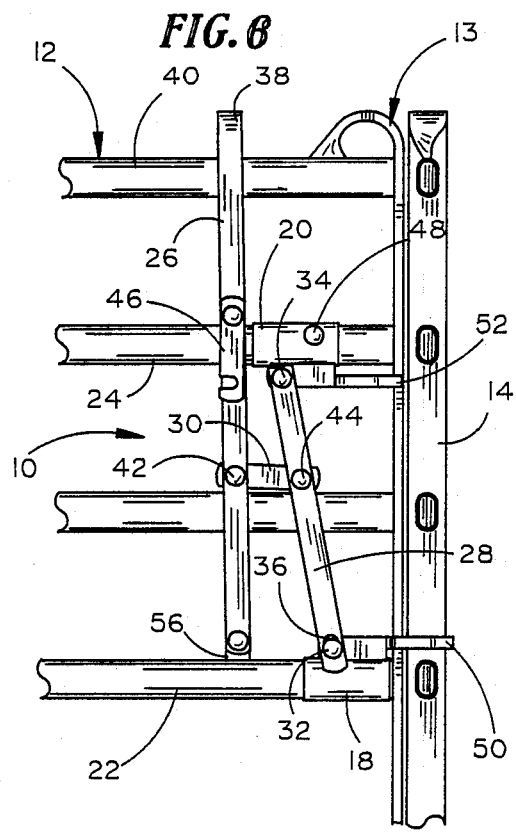

ANIMAL GATE LATCH MECHANISM

BACKGROUND OF THE INVENTION

The invention relates to animal gate latch mechanisms and, more specifically, to an animal gate mechanism wherein a pair of latch members are operatively associated for selective actuation to open and closed positions by operation of a single actuating arm.

Corrals, runways, and fenced enclosures of many diverse types are used in the husbandry of animals. Gates which are pivotally mounted at one end and include latch mechanisms at the other end are often used to control the movement of animals between enclosures or separate control areas. Such gates, moreover, may be frequently opened and closed during the movement or sorting of animals and will also be latched closed for extended periods of time when the animals are confined to a single area for such extended periods. Those who work with livestock animals, particularly cattle and horses, are frequently mounted on horses during many of the animal control operations. It is a particular advantage to be able to open and latch gates from horseback so that the rider/worker does not have to dismount in order to operate the latch mechanism. Because a gate must be a sufficient height to prevent the escape of confined animals, a single latch point generally permits a twisting movement of the gate to allow an animal to squeeze there through. A latch mechanism which incorporates two, spaced-apart latch members and corresponding latch points will prevent such pivoting or twisting movement.

A number of gate latches having two latch members operatively controlled from a single point above the gate are known in the art. For example, U.S. Pat. No. 846,804 teaches a gate latch having two latch mechanisms which are simultaneously opened and closed by the pivotal movement of a hand lever. Similarly, two latch members are simultaneously opened and closed by the movement of a single hand lever in U.S. Pat. No. 727,139. In U.S. Pat. No. 1,049,453, downward movement on a hand lever acts to raise simultaneously a pair of latch members to permit a one-way opening of a gate.

The present invention improves on the prior art by providing a gate latch having two latch members which are operatively moved in alternating sequence by a single actuating arm. Thus, the gate latch of the present invention provides an intermediate latched position wherein only one of the latch members is closed and a fully latched position wherein both of the latch members are closed. The intermediate position can be effected by a single quick motion of a person astride a horse operating the gate during an animal control operation.

SUMMARY OF THE INVENTION

The invention consists of a latch for securing gates or other swinging closures to a gate post or fence and which will latch the gate to the gate post at either one or both of two points by operation of a single actuating arm. The actuating arm is mounted at a low point near the free end of the gate for pivotal movement in the vertical plane of the gate. A lower latch member is mounted on the gate adjacent the pivot point of the actuating arm for horizontal movement from a gate opening position to a gate latching position. Spaced above the lower latch member is an upper latch member similarly mounted on the gate for horizontal movement from a gate opening position to a gate latching position. The upper and lower latch members are pivotally interconnected by an upright first linkage arm. A second, substantially horizontal linkage arm pivotally interconnects the actuating arm and the first linkage arm intermediate the ends thereof.

In normal operation, pivotal movement of the actuating arm toward the gate post from a gate opening position will successively move the upper latch member and the lower latch member from their gate opening positions to a gate latched position. To open the gate latch mechanism, pivotal movement of the actuating arm away from the gate post will successively move the upper latch member from its latched position and then the lower latch member from its latched position to their gate opening positions. Should either of the upper or lower latch members be restrained against movement to the gate latching positions therefor, the other latch member will remain operative by the actuating arm for movement between its open and closed or latched position. A keeper bar releasably interconnects the actuating arm and the upper latch member in its latched position to secure the gate latch mechanism in its fully latched position.

BRIEF DESCRIPTION OF THE DRAWING

FIGS. 3-6 are diagrammatic views showing in sequence movement of the gate latch mechanism from its fully open position to its fully closed position and then to an intermediate closed position.

DETAILED DESCRIPTION OF A PREFERRED EMBODIMENT

Figure 1:
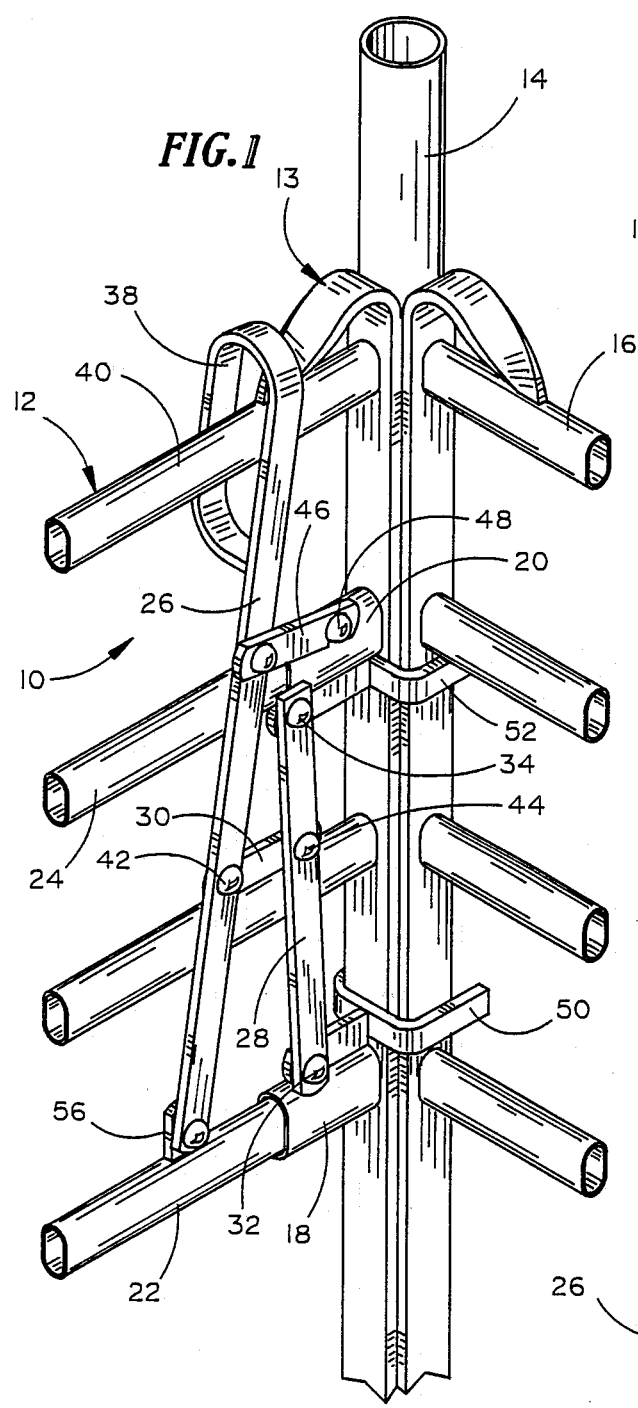
FIG. 1 is a detail perspective view of the free end of a gate and an associated gate post shown in assembly relation with the gate latch mechanism of the present invention.

Illustrated in FIG. 1, generally at 10, is a gate latch mechanism mounted on a horizontally swingable gate 12, the free-end portion of which is shown at 13, latched to an upright gate post 14. A section of one end of a fence panel 16 is fixed to the gate post 14 and, in combination with the gate 12, forms a part of an animal enclosure. The gate latch mechanism 10 includes a lower latch unit 18 and an upper latch unit 20 that are mounted for sliding movement on vertically spaced horizontal bars 22 and 24, respectively, of the gate 12. The latch units 18 and 20 are interconnected by a linkage system for successive and alternating movement of the latch units 18 and 20 relative to the gate post 14 between gate opening and gate latching positions thereof. Each of the lower and upper latch units 18 and 20 includes a generally U-shaped latch member 50 and 52, respectively, for releasable capture of the gate post 14 and adjacent fence panel 16 when in a gate latching position therefor.

The linkage system includes an upright actuating arm 26, an upright link 28 and a horizontal link 30 pivotally interconnecting the actuating arm 26 and the upright link 28 intermediate the ends thereof. The upright link 28 is pivotally attached at its lower end portion to the lower latch unit 18 and at its upper end portion to the upper latch unit 20, by pins 32 and 34, respectively. An elongated hole 36 (FIG. 7) in the lower end portion of the upright link 28 receives the pin 32 in a lost motion connection between the upright link 28 and the lower latch unit 18. It is to be understood, however, that the upright link 28 can be in a lost motion connection with either or both of the latch units 18 and 20.

The lower end of the actuating arm 26 is pivotally mounted on a mounting ear 56 on the lower horizontal bar 22 adjacent the lower latch unit 18. The actuating arm 26 extends upwardly and includes a handle 38 of a shape to loosely encircle in a guided relation an uppermost horizontal bar 40 of the gate 12. The actuating arm 26 is, accordingly, pivotally moveable in the vertical plane of the gate 12 by relative movement of the handle 38 toward and away from the free-end portion 13 of the gate 12.

The horizontal link 30 pivotally interconnects the actuating arm 26 and the upright link 28 at pins 42 and 44, respectively. In the preferred embodiment, pin 44 is somewhat nearer the upper end portion than the lower end portion of the upright link 28. A keeper bar 46 is pivotally mounted at one end to the actuating arm 26 for releasable capture of a pin 48 which projects laterally from the upper latch unit 20 when the gate latch mechanism 10 is in a fully closed position, as illustrated in FIG. 1. In the captured or locked position, the keeper bar 46 will prevent movement of the actuating arm 26 in a direction to open the gate latch mechanism 10 and so will prevent the gate from being opened by any movements of the confined animals.

Figure 2:
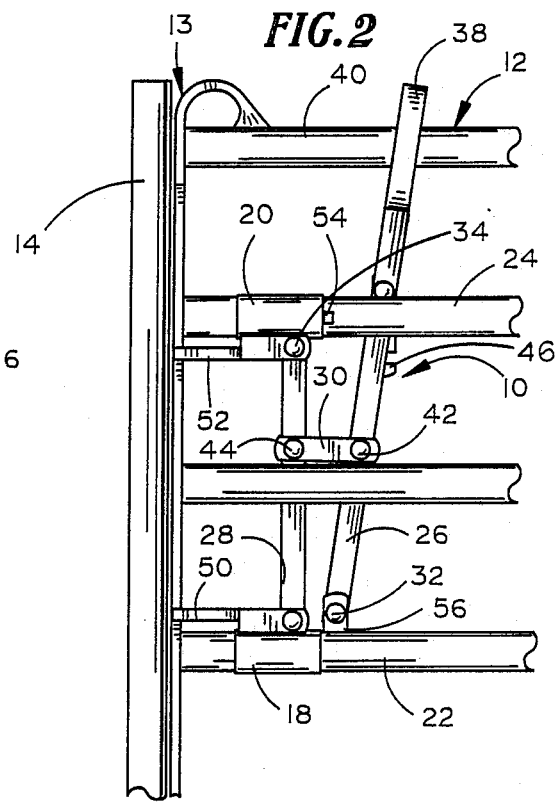
FIG. 2 is a reduced elevational view of the gate latch mechanism in its open position as viewed from the left rear of FIG. 1.

As best illustrated in FIG. 2, a gate opening position of the gate latch mechanism 10 is defined by retraction of the upper latch unit 20 until it is in contact engagement with a stop member 54 located on the upper horizontal bar 24 of the gate 12. The lower latch unit 18 is retracted to a fully opened position defined by contact engagement of the lower latch unit 18 with the upright ear 56. In the fully open position of the gate latch mechanism 10, the lower and upper latch units 18 and 20 are retracted so that the ends of the U-shaped latch members 50 and 52 are within the confines of the gate 12, thus clearing the post 14.

In describing the operation of the gate latch mechanism 10, reference is made to the sequence of views depicted in FIGS. 3-6. In a fully open position of the gate latch mechanism 10 (FIG. 3), the lower latch unit 18 is fully retracted to be in abutting engagement with the mounting ear 56. The upper latch unit 20 is fully retracted to be in abutting engagement with the stop member 54 (FIG. 2). In the fully open position, when the gate 12 is permitted to swing freely, the actuating arm 26 is tilted away from the free end 13 of the gate 12 and the upright link 28 is substantially vertical. At this time, the pin 32 is at the upper end of elongated hole 36 such that the lower end portion of the hole 36 extends below the pin 32.

Movement of the upper end portion or handle 38 of the actuating arm 26 toward the gate post 14 will, by way of the horizontal link 30, pivot the upright link 28 about pin 32 and thereby horizontally move the upper latch unit 20 into the gate latching position therefor (FIG. 4). With reference to the lost motion connection at the lower end portion of the upright link 28, the pin 32 moves to the lower end of elongated hole 36 such that the upper end of the hole 36 extends above the pin 32. Accordingly, in this intermediate position of the actuating arm 26, only the upper latch unit 20 has been moved to its gate latching position while the lower latch unit 18 remains in its gate opening position. Thus, a quick throw or flick of the handle 38 will serve to latch the gate 12 at a single position, a movement that can be quickly and conveniently effected by a person on horseback. While the gate in the intermediate position is not as secure as if both latch units were in the closed position, the intermediate position is satisfactory for quick and temporary latching of the gate during animal control operations.

If latching of the gate 12 at two points is desired, additional movement of the handle 38 of the actuating arm 26 toward the gate post 14, or the free-end portion 13 of the gate 12, will move the gate latch mechanism 10 to its fully latched position (FIG. 5). With the upper latch unit 20 in the gate latching position therefor, as illustrated in FIG. 4, movement of the actuating arm 26 toward the free end 13 of the gate 12 will, by way of the horizontal link 30 pivot the upright link 28 about pin 34 to horizontally move the lower latch unit 18 to its gate latching position (FIG. 5). In the fully latched position of the gate latch mechanism 10, the upright link 28 is again in a substantially vertical position wherein the pin 32 is at the upper portion of the elongated hole 36. In the fully latched position, if the keeper bar 46 is pivoted to capture the pin 48 (FIG. 1), the actuating arm 26 will be constrained against movement away from the free end 13 of the gate 12 so that the gate latch mechanism 10 will remain in the fully latched until the keeper bar 46 is released.

To open the gate latch mechanism 10 from its fully latched position, the handle 38 of the actuating arm 26 is moved in a direction away from the gate post 14. The pulling action on the horizontal link 30 will pivot the upright link 28 about the pin 32 to slideably move the upper latch unit 20 from its latched position to its open position (FIG. 6) wherein the upper latch unit 20 is in abutting engagement with the stop member 54 (FIG. 2). With the upper latch unit 20 thus constrained against further horizontal movement, additional movement of the actuating arm 26 in a direction away from the gate post 14 will retract the lower latch unit 18 thereby moving the gate latch mechanism 10 to its fully open position, as illustrated in FIG. 3.

In the intermediate position of the handle 38 (FIG. 4), movement of the actuating arm 26 in a direction away from the gate post 14 will retract the upper latch unit 20 thereby moving the gate latch mechanism 10 to its fully open position, as illustrated in FIG. 3.

Figure 7:
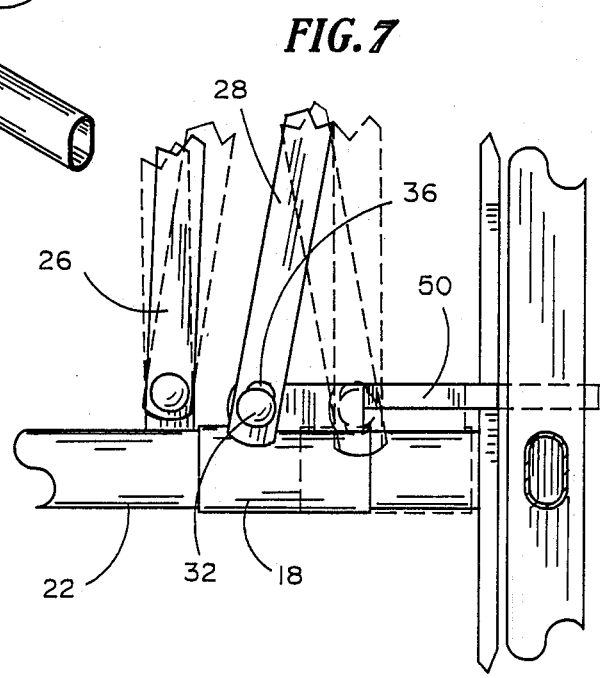
FIG. 7 is an enlarged detail view of the lower end of the actuating arm and a lost motion connection between a first linkage arm and the lower latch mechanism member and showing in dotted line movement of each element corresponding to the positions of the gate latch mechanism illustrated in FIGS. 3-6.

The movement and relative positions of the lower end portions of the gate latch mechanism 10 corresponding to FIGS. 4-6 are illustrated in solid and broken line in FIG. 7, to better illustrate the relative movement in the lost motion connection between the upright link 28 and pin 32 within the elongated hole 36 in the intermediate latched position, fully latched position, and intermediate open position of the gate latch mechanism 10.

As a consequence of the independent movement of the upper latch unit 20 and the lower latch unit 18, either latch unit will remain operative to move between an open and a latched position therefor even if the other latch unit is prevented for some reason from movement. This feature is particularly important when a horseman is trying to close and latch the gate against a group of animals that may be pressing against the gate trying to force it open. Regardless of whether the horseman can get both latch units in proper alignment to be moved to the latched position therefor, if either of the latch units is appropriately aligned with the gate post, movement of the actuating arm will act to move the one properly aligned latch unit to its latched position thereby securing the gate.

Although the invention has been described with respect to a preferred embodiment thereof, it is to be understood that it is not to be so limited since changes and modifications can be made therein which are within the full intended scope of the invention as defined by the appended claims.

I claim:

1. A gate latch mechanism for releasably latching the free end of swingable gate to an upright gate post, comprising:
   (a) an upper latch unit movably mounted on the gate for horizontal movement from a gate opening position to a gate latching position with the post;
   (b) a lower unit moveably mounted on the gate for horizontal movement from a gate opening position to a gate latching position;
   (c) an upright link movably connected at the upper end thereof to said upper latch unit and at the lower end thereof to said lower latch unit;
   (d) an upright actuating arm pivotally attached at the lower end thereof to the gate at a position adjacent said lower latch unit; and
   (e) a horizontal link pivotally interconnected to said actuating arm and to said upright link intermediate the ends thereof;
   (f) wherein said actuating arm and said upright link and said horizontal link are configured whereby on continuous pivotal movement of said actuating arm in one direction about the lower end thereof said upper and lower latch units are successively moved from said gate opening position therefor to said gate latching position therefor and on continuous pivotal movement of said actuating arm in the opposite direction said upper and lower latch units are successively moved from said gate latching positions therefor to said gate opening positions therefor.

2. The gate latch mechanism of claim 1, wherein:
   (a) said actuating arm is pivotally movable to a full gate open position, an intermediate gate open position, and a full closed gate position; and said upper and lower latch units are in the open positions therefor when said actuating arm is in said full open gate position therefor;
   (b) said upper latch unit being movable from said open position to said latched position therefor on movement of said actuating arm from the full gate open position to the intermediate gate open position therefor, when said lower latch unit is retained in said open position therefor; and
   (c) said lower latch unit being movable from the open position to the latched position therefor, on movement of the actuating arm from the intermediate gate open position to the full gate closed position therefor, whereby the gate is latched to the post at two spaced-apart locations by said latch units in the latched positions therefor.

3. The gate latch mechanism of claim 1, wherein: (a) said actuating arm is pivotally movable between a full gate closed position therefor, an intermediate gate closed position therefor, and a full open gate position therefor, with said upper and lower latch units both in the latched positions therefor when said actuating arm is in said full gate closed position therefor;
   (b) with said upper latch unit, when said lower latch unit is retained in the latched position therefor, on movement of said actuating arm from the full gate closed position to the intermediate gate closed position, being movable from the latched position to the open position therefor; and
   (c) said lower latch unit being movable from said latched position to said open position therefor, on movement of said actuating arm from the intermediate gate closed position to the full gate open position therefor.

4. The gate latch mechanism of claim 1, including (a) means for releasably connecting said actuating arm and said upper latch unit, when the upper latch unit and the lower latch unit are in the latched positions therefor, to lock said actuating arm against movement in the full gate closed position therefor.

5. The gate latch mechanism of claim 1, wherein (a) said upright link is pivotally connected with at least one of said latch units in a lost motion connection.

6. The gate latch mechanism of claim 1, including, (a) a stop number on said gate engageable with the upper latch unit to define the gate open position thereof.

* * * * *